US006591612B2

(12) United States Patent
Bolz et al.

(10) Patent No.: US 6,591,612 B2
(45) Date of Patent: Jul. 15, 2003

(54) ELECTRICALLY OPERATED CHARGE-AIR COMPRESSOR

(75) Inventors: Martin-Peter Bolz, Buehl (DE); Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/061,199

(22) Filed: Feb. 4, 2002

(65) Prior Publication Data

US 2002/0134082 A1 Sep. 26, 2002

(30) Foreign Application Priority Data

Mar. 20, 2001 (DE) .......................................... 101 13 308

(51) Int. Cl.$^7$ ................................................ F02B 33/44
(52) U.S. Cl. .......................................... 60/608; 123/565
(58) Field of Search .......................... 60/607, 608, 618; 123/565

(56) References Cited

U.S. PATENT DOCUMENTS 6,029,452 A * 2/2000 Halimi et al. ................. 60/608
6,141,965 A * 11/2000 Woollenweber et al. ...... 60/608
6,449,950 B1 * 9/2002 Allen et al. ................... 60/607
6,474,066 B1 * 11/2002 Lin .............................. 60/607

* cited by examiner

Primary Examiner—Sheldon Richter
(74) Attorney, Agent, or Firm—Ronald E. Greigg

(57) ABSTRACT

The invention relates to an electrically operated charge-air compressor, for connection to an internal combustion engine, which includes an electric motor with a stator and a rotor for driving a compressor impeller; the compressor impeller is disposed in a compressor housing that is provided with at least one air inlet and one air outlet, and the air inlet and the air outlet communicate via a flow conduit extending in the compressor housing, and by rotation of the compressor impeller in a compression portion of the flow conduit, a compression of the charge air is attainable. It is proposed that the charge-air compressor be refined such that the compressor impeller can be displaced in the compressor housing out of a working position into a position of repose and back again, and the compressor impeller upon a displacement into the position of repose is moved at least partway away from the compression portion.

23 Claims, 3 Drawing Sheets

ELECTRICALLY OPERATED CHARGE-AIR COMPRESSOR

BACKGROUND OF THE INVENTION

1. Field of the Invention

The invention relates to an electrically operated charge-air compressor for supplying combustion air of an internal combustion engine.

2. Description of the Prior Art

It is known to increase the power density of an internal combustion engine by compressing the charge air required for combusting the fuel using an exhaust-gas turbocharger, which comprises a turbine and a compressor that is operated in the charge-air input duct of the engine. Particularly in motor vehicle drive mechanisms, exhaust-gas turbochargers have the disadvantage of delayed and inadequate response at low engine rpm. To improve the response of the exhaust-gas turbocharger, it is known for the exhaust-gas turbocharger to be reinforced by an electrical auxiliary drive mechanism. This can be attained for instance by means of an electric motor integrated with the exhaust-gas turbocharger; at low engine rpm, this electric motor provides a reinforcing drive of the shaft of the exhaust-gas turbocharger. However, not only must the electric motor be capable of withstanding high rpm, but the electrical power consumption is also high, because of the high moments of mass inertia of the exhaust-gas turbocharger turbine, which is made of high-temperature-resistant steel.

For overcoming these disadvantages, it is known, for instance from U.S. Pat. No. 6,029,452, to operate an electrically operated charge-air compressor, also known as an electrically operated auxiliary charger or an electric turbocompressor in the charge-air input duct of an internal combustion engine in series with a conventional exhaust-gas turbocharger. This has the advantage that the electric turbocompressor, inserted separately into the charge-air input duct, can be optimized for the lowest rpm range of the engine, and because of the markedly lesser moment of mass inertia, its power consumption is markedly less. In the high rpm and throughput range, a bypass embodiment is employed in order to deliver the charge air directly to the exhaust-gas turbocharger, completely bypassing what is then the inactive electric turbocompressor. To that end, a butterfly valve is used, which diverts the flow of charge air into the bypass conduit so that it no longer flows through the electrically operated turbocompressor. However, the bypass embodiment is not optimal in terms of the thermodynamic requirements and is very complicated and expensive in terms of assembly, size and expense for the entire system.

OBJECT AND SUMMARY OF THE INVENTION

The electrically operated charge-air compressor of the invention overcomes the disadvantages that occur in the prior art and makes it possible for an electric turbocompressor to be operated in the charge-air input duct of an internal combustion engine in series with an exhaust-gas turbocharger, without requiring a bypass conduit for bypassing the turbocompressor. As a result, the entire system can advantageously be optimized thermodynamically. The bypass conduit with the check valve can be omitted. Assembly can be made considerably easier, and both the required space and the costs can be reduced markedly. This is advantageously attained by providing that at medium to high rpm of the engine, the compressor impeller of the electric turbocompressor can be displaced out of a compression portion of the flow conduit for the charge air at least partway into a position of repose, so that at high engine rpm, the charge air can flow quasi-unhindered through the compression portion, without being hindered in doing so by the compressor impeller of the compressor that is now inactive.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
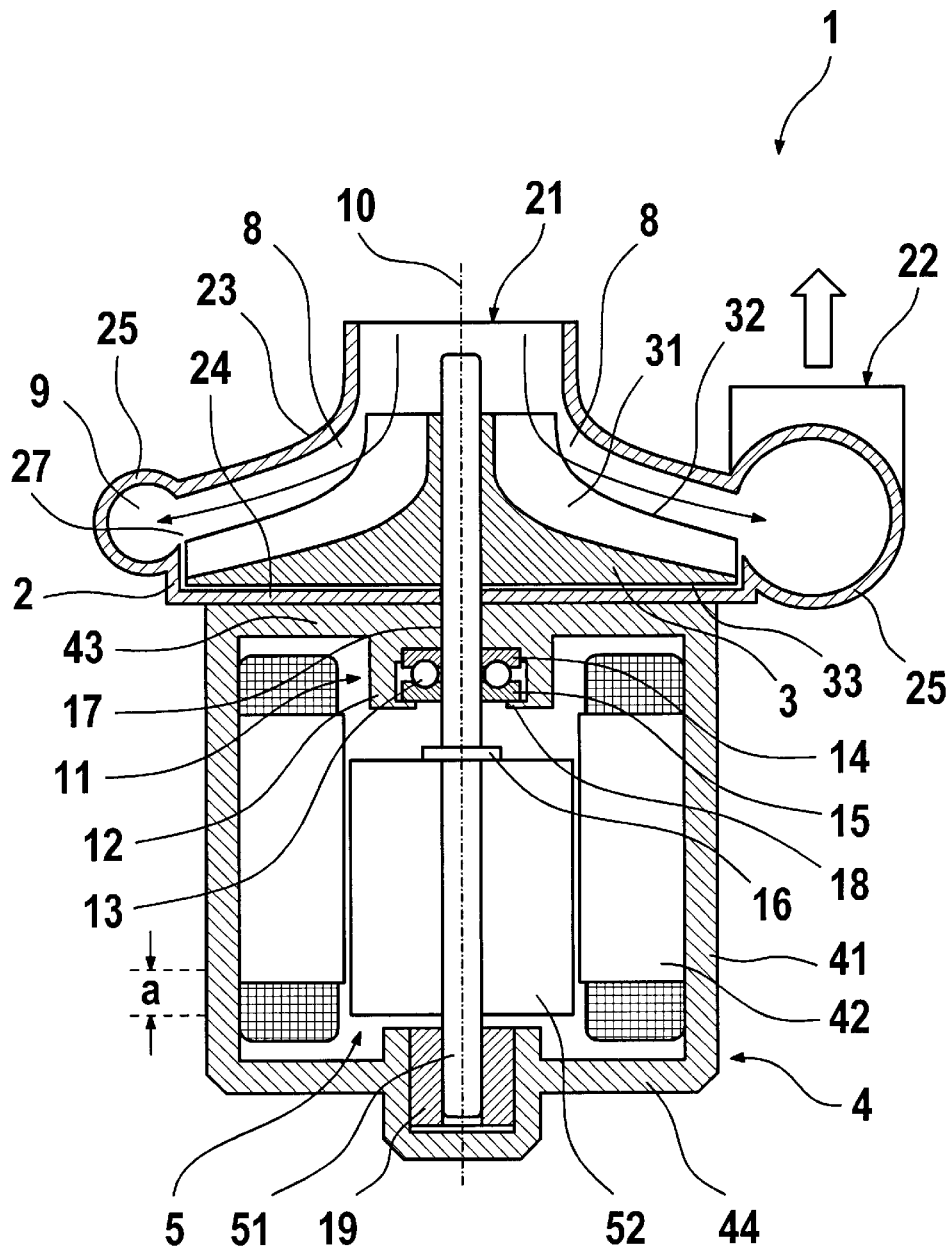
FIG. 1 is a cross section through the electrically operated charge-air compressor in the axial position of repose of the compressor impeller.

FIG. 1 shows a first exemplary embodiment of the charge-air compressor of the invention. The charge-air compressor 1 has an electric motor and a compressor part for compressing charge air.

In the exemplary embodiment shown here, the compressor part is embodied as a radial compressor. A compressor housing 2 has a cup-shaped base part, with a circular bottom wall 24. Opposite the bottom wall 24 is a funnel-shaped cap wall 23 with a central air inlet 21. The space between the bottom wall 24 and the cap wall 23 communicates, through a lateral opening 27 that extends in the circumferential direction, with the interior 9 of a worm 25, which has a diameter that increases in the circumferential direction. A portion of the worm 25 has an air outlet 22 leading out of the compressor housing 2. As FIG. 1 shows, in the compressor housing 2 a compressor impeller 3 is disposed on a shaft 51, concentrically to the air inlet 21. The compressor impeller 3 has a flat underside 33, which faces toward the bottom wall 24. The shaft 51 is guided through the bottom wall 24 to the electric motor. The top side of the compressor impeller 3, remote from the underside 33 of the compressor impeller 3, is provided in a manner known per se with compressor structures 31, in the form of three-dimensionally structured vanes, whose outermost edge protruding toward the cap wall 23 is adapted to the inner contour of the funnel-shaped cap wall 23. From the air inlet 21, a flow conduit for charge air extends along the inside of the cap wall 23 as far as the opening 27, from which point the flow conduit communicates with the air outlet 22, via the interior 9 of the worm 25. The portion of the flow conduit extending along the inside of the cap wall 23 as far as the opening 27 forms a compression portion 8. As best seen from FIG. 2, in operation of the charge-air compressor 1, the vanes 31 of the rotating compressor impeller 3 engage the compression portion 8 of the flow conduit. The upper edge 32 of the vanes 31, oriented toward the edge of the cap, is then spaced apart from the cap part 23 by only a very small gap, which is precisely large enough that the vanes 31 are reliably prevented from striking the cap wall 23. The charge air that reaches the compression portion 8 from the air inlet 21 during operation is speeded up by the rotating vanes 31 and increasingly compressed toward the opening 27 by the resultant centrifugal forces. The compressed charge air passes through the opening 27 to reach the worm 25 and from there reaches the air outlet 22.

The electric motor includes a stator 4 and a rotor 5. The stator 4 has a closed housing 41, which is mounted on the bottom wall 24 of the compressor housing 2, and an electromagnet 42 that is disposed in stationary fashion in the housing 41. The rotor 5 of the electric motor, in the exemplary embodiment shown here, is embodied as a so-called inner rotor. However, it is also possible to embody the rotor 5 as a bell rotor; in that case, the rotor is disposed concentrically about the stator. The rotor 5 is rotatably supported in the housing 41 and includes a magnet armature 52, which is disposed concentrically about a shaft 51; this shaft 51 is supported both rotatably and axially displaceably in the housing 41 of the stator 4, as will be described in further detail hereinafter.

In the exemplary embodiment shown here, the electric motor is embodied as a reluctance motor, and the magnet armature 52 and electromagnet 42 each have a circular-annular cross section with segmental recesses. When voltage is imposed on the electromagnet 42, reluctance forces operative between the electromagnet 42 and the magnet armature 52 cause the magnet armature 52 to be aligned by a rotation about the pivot axis 10 such that the magnetic resistance in the magnetic circuit is minimized by the rotary motion. By means of an electronic control circuit, the electromagnet 42 can be triggered in a manner known per se such that the magnet armature 52 and the shaft 51 are set into rotation about the pivot axis 10.

In the charge-air compressor 1 of the invention, the shaft 51 is supported rotatably and axially displaceably. This purpose is served by an axial ball bearing 11, which is disposed on a wall 43 of the housing 41 facing toward the compressor housing 2, and by a slide bearing 17 in the wall 43 and a slide bearing 19 that is disposed on the wall 44 of the housing 41 facing away from the compressor housing 2. The axial ball bearing 11 is constructed on the order of a ball bush with a ball guide. The ball guide, or race, has a first guide part 14 and a second guide part 15, which is axially movable relative to the first guide part 14. Between the first guide part 14 and the second guide 15, a plurality of balls 13 are supported in such a way that the balls 13 roll directly on the shaft 51. The guide parts 14, 15 with the balls 13, are located in a bush 12, which is disposed on the wall 43 of the housing 41 toward the compressor housing 2. An inward-protruding collar 18 of the bush 12 embraces the second guide part 15 and thus keeps the balls 13 and guide parts 14, 15 together. The inside diameter of the collar 18 is made larger than the outside diameter of a stop part 16, which is disposed fixedly on the shaft 51. The stop part 16 limits the axial mobility of the shaft 51 upon a displacement into the position shown in FIG. 2, by means of contact with the second guide part 15. Naturally, it is possible to use other bearings instead of the bearings shown here as an example. What is important is that the shaft be supported rotatably and axially displaceably.

Figure 2:
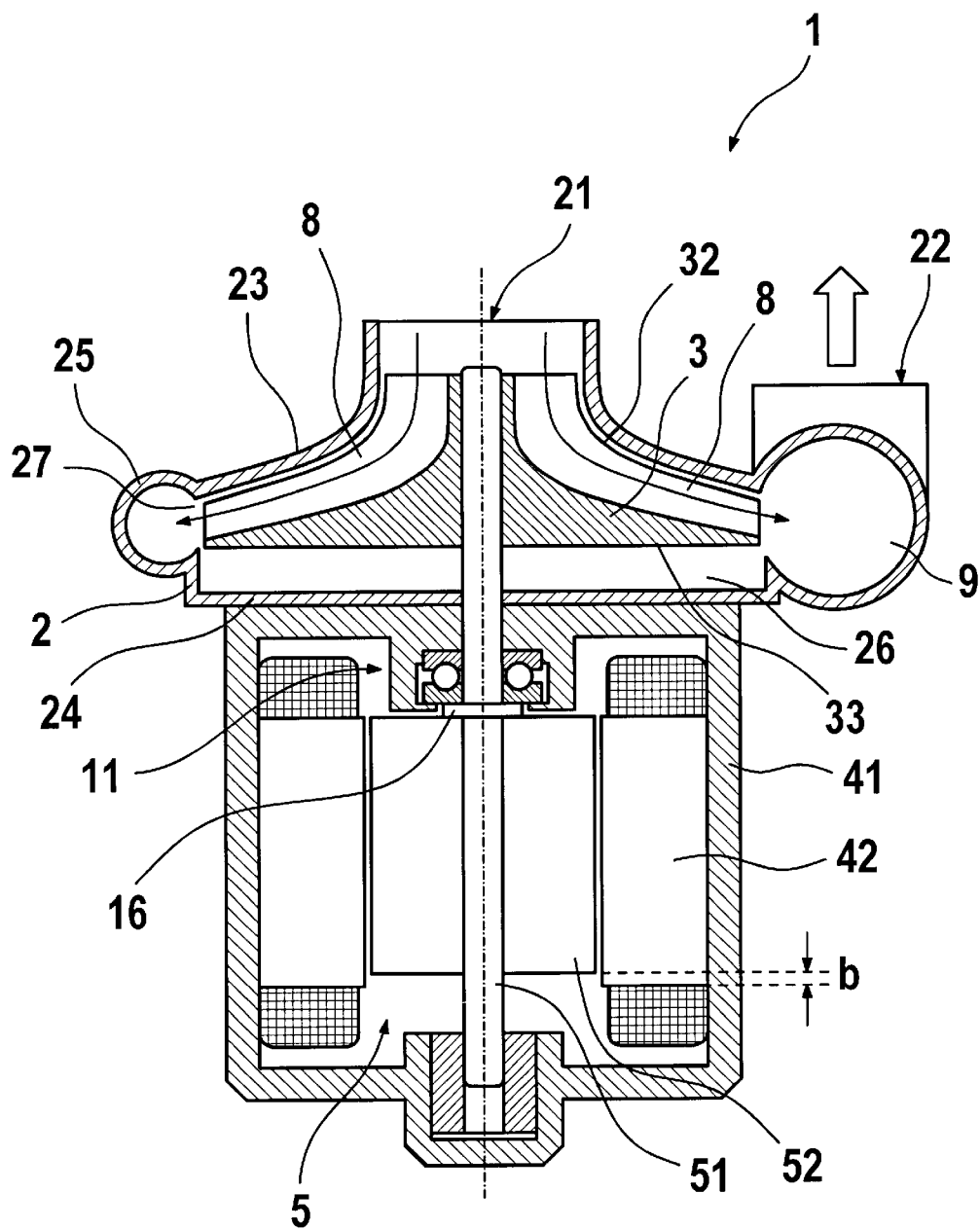
FIG. 2 is a cross section through the electrically operated charge-air compressor of FIG. 1, in the second working position of the compressor impeller.
Figure 3:
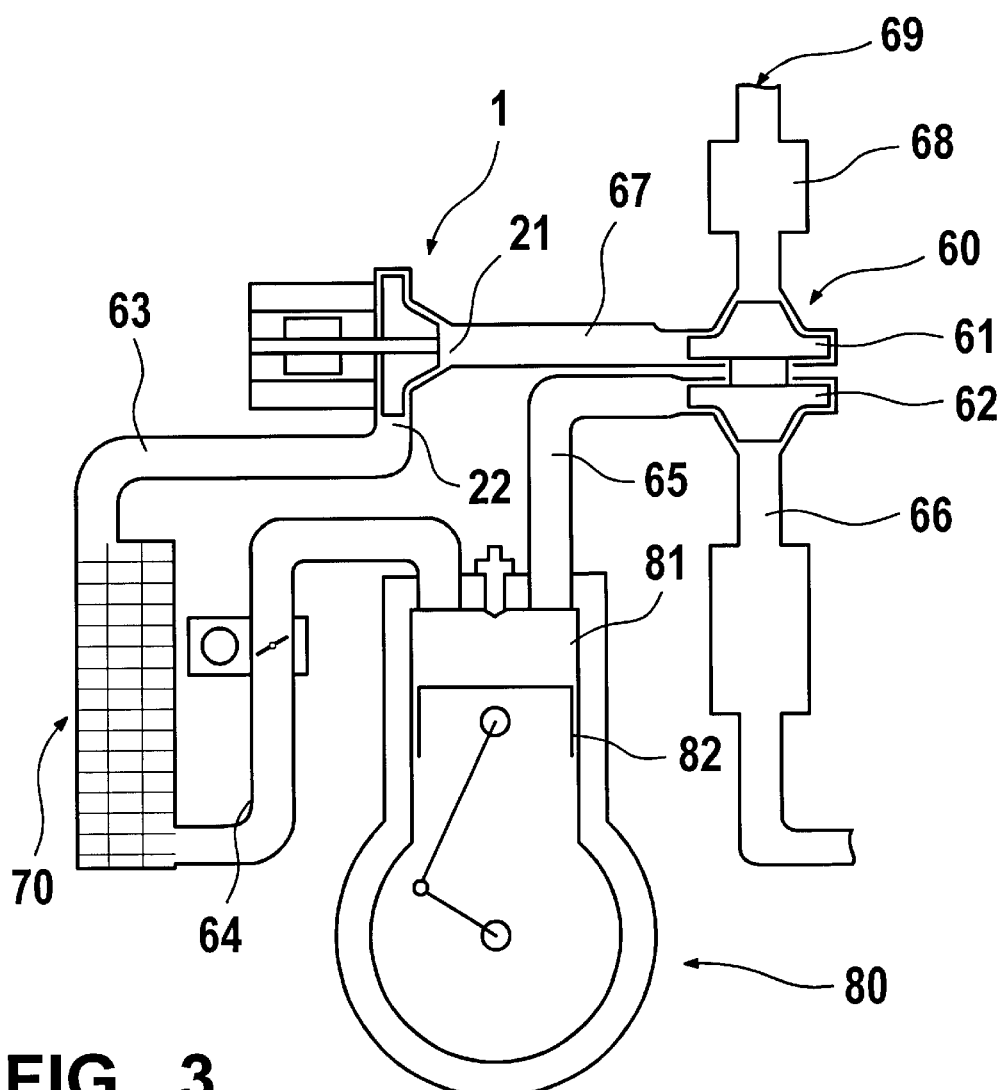
FIG. 3 shows an arrangement with electrically operated charge-air compressor in the charge-air input duct of an internal combustion engine.

FIG. 3 schematically shows how the electrically operated charge-air compressor shown in FIGS. 1 and 2 can be disposed in the charge-air input duct of an internal combustion engine, such as an Otto engine. An internal combustion engine 80 is shown in simplified form, with pistons 82 and a combustion chamber 81. The combustion chamber 81 communicates via valves with a charge-air input duct 64 and an exhaust-gas discharge duct 65. Via the exhaust-gas discharge duct 65, the exhaust gases reach the turbine 62 of an exhaust-gas turbocharger 60, and from there they reach the environment via a further exhaust conduit 66. The charge-air input duct 64 of the engine is connected to a charge-air radiator 70, which is connected via an input portion 63 to the air outlet 22 of the electrically operated charge-air compressor 1. The air inlet 21 of the charge-air compressor 1 is also connected in turn, via a further input portion 67, to the outlet of the compressor 61 of the exhaust-gas turbocharger. The inlet of the compressor 61 communicates with the inlet 69 of the charge-air input duct via an air filter 68. When the engine is started, the electrically operated charge-air compressor 1 is actuated, for reinforcing the exhaust-gas turbocharger in the lower rpm range of the engine. The compression ratios of the electrically operated charge-air compressor 1 and the compressor 61 of the exhaust-gas turbocharger 60 supplement one another multiplicatively. An overrunning air circulation valve, not shown but typically present in the exhaust-gas turbocharger, together with an associated electronic triggering means can be used, in the first phase after the actuation of the electrically operated charge-air compressor, to bypass the exhaust-gas turbocharger briefly in order to prevent transient throttling of the exhaust-gas turbocharger. Once this phase has elapsed, the valve can be closed, so that the charge air reaches the inlet of the charge-air compressor via the compressor of the exhaust-gas turbocharger. The charge-air compressor 1 can also be combined structurally in a unit with an electronic control circuit for triggering it and/or with the charge-air radiator 70.

The mode of operation of the electrically operated charge-air compressor 1 will now be described. At the outset, that is, immediately before starting of the charge-air compressor 1, the unit comprising the rotor 5 and compressor impeller 3 is in the position of repose shown in FIG. 1. In this position, the rotor 5 can be in contact with a stop, not shown, on the wall 44. When voltage is imposed on the electromagnet 42, magnetic reluctance forces cause the magnet armature 52 of the rotor 5 to be displaced out of the asymmetrical position by the distance a in the axial direction and to be aligned in a symmetrical position relative to the electromagnet 42. When the symmetrical position is reached, the reluctance forces acting in the axial direction vanish, but the reluctance forces acting in the circumferential direction do not and cause a rotation of the rotor 5. An axial deflection of the magnet armature 52 beyond the symmetrical position is counteracted by the reluctance forces. In other words, the reluctance forces center the magnet armature 52 in its axial alignment relative to the electromagnet 42. By the resultant axial displacement of the shaft 51 connected to the magnet armature 52, the compressor impeller 3 disposed on the shaft 51 is pulled into a first working position, in which the vanes 31 of the compressor impeller 3 engage the compression portion 8. In this position, the stop part 16 is still advantageously some distance away from the axial ball bearing 11. When the compressor 1 is switched on, this accordingly prevents an irritating impact noise upon impact of the rotor 5 with the axial ball bearing 11 is thus prevented.

The rotation of the compressor impeller 3 in the first working position causes a compression of the charge air in the compression portion 8 of the flow conduit. As can be seen particularly in FIG. 2, between the side 33 of the compressor impeller 3 facing away from the vane structure and the bottom wall 24 of the compressor housing 2, a pressure chamber 26 is formed, which communicates with the flow conduit 8, 9 in the transitional region between the interior 9 of the worm 25 and the compression portion 8. In operation of the charge-air compressor 1, the pressure chamber 26 is subjected to high pressure. As a consequence of the high pressure prevailing in the pressure chamber 26, the compressor impeller 3 is displaced axially into the second working position, shown in FIG. 2, in which the vanes 31 fully engage the compression portion 8 and are now spaced apart from the cap wall 23 by only a small safety gap. As a result of this second displacement of the compressor impeller 3, the magnet armature 52 is pulled out of the symmetrical position. In FIG. 2, the spacing b is equivalent to the double deflection of the magnet armature 52 out of the symmetrical position. The reluctance forces, which result from this deflection and seek to pull the magnet armature 52 into the symmetrical position, are compensated for by the static pressure forces in the pressure chamber 26. The reluctance forces can be adjusted, by suitable dimensioning of the electric motor, such that a hard impact of the stop part 16 on the axial ball bearing 11 in the second working position is averted. Irritating noises are thus avoided. If the high pressure in the pressure chamber 26 exceeds the reluctance forces, then the stop part 16 is pressed against the guide part 15 of the axial ball bearing 11. The pressure buildup is initially slower with increasing rpm, and as a result in the second working position, a harmonic rotary motion without a strong impact on the part of the rotor is attained.

As soon as the compressor 61 of the exhaust-gas turbocharger 60, in FIG. 3, after an initial delay increasingly delivers compressed charge air to the electrically operated charge-air compressor 1, the air inlet 21 of the charge-air compressor is subjected to a high pressure, compared to the air pressure in the pressure chamber 26, and as a result the compressor impeller 3 is forced back out of the second working position toward the bottom wall 24 into the first working position. As a result, the vanes 31 of the compressor impeller 3 are move partway out of the compression portion 8. As long as the electromagnet is still subjected to a voltage, however, the reluctance forces keep the magnet armature 52 in the symmetrical position. When the electromagnet is switched off, finally, the charge air flowing through the air inlet 21 presses the compressor impeller 3 back into the position of repose (FIG. 1). This motion can optionally be reinforced by a return spring, which is inserted for instance between the housing wall 43 and the rotor 5. If the orientation of the charge-air compressor 1 is such that gravity acts from top to bottom in the direction of the rotation axis 10 in FIG. 1, then the return of the compressor impeller 3 is also reinforced by the weight of the unit formed by the rotor 5 and the compressor impeller 3. As a result of the displacement of the compressor impeller 3 into the first working position and from there into the position of repose, the vanes 31 are moved away from the compression portion 8 and are advantageously moved entirely away from it, so that the charge air flows through the flow conduit in the compressor housing 2 largely unhindered, as is represented by the arrows in FIG. 1. The charge-air compressor 1 can advantageously be switched off in sliding fashion; that is, the voltage applied to the electromagnet is reduced gradually. At higher engine speeds, the exhaust-gas turbocharger then increasingly takes on the task of charging the engine.

Figure 4:
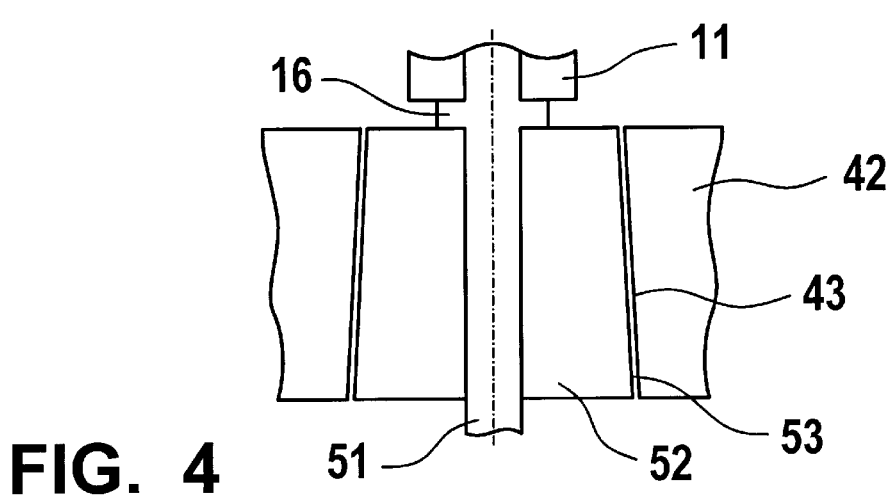
FIG. 4 shows a detail of the electric motor of the charge-air compressor with a conical electromagnet and a magnet armature, in a further exemplary embodiment of the invention.

In a departure from the exemplary embodiment shown in FIGS. 1 and 2, it is provided in a further exemplary embodiment that the electromagnet 42 and the magnet armature 52 are embodied conically, as shown schematically in FIG. 4. As the drawing shows, the sides 43, 53 facing one another of the electromagnet 42 and magnet armature 52, respectively, are embodied conically, specifically in such a way that the outer diameter of the magnet armature 52 and the inner diameter of the electromagnet 42 decrease toward the stop part 16. As a result, a greater attraction of the magnet armature 52 upon imposition of voltage on the electromagnet is attained. However, in this exemplary embodiment, the rotor with the stop part 16 is always pressed against the axial ball bearing 11 on the housing 41 of the electromagnet when energized.

The foregoing relates to preferred exemplary embodiments of the invention, it being understood that other variants and embodiments thereof are possible within the spirit and scope of the invention, the latter being defined by the appended claims.

We claim:

1. An electrically operated charge-air compressor for connection to an internal combustion engine, the compressor comprising an electric motor with a stator (4) and a rotor (5) for driving a compressor impeller (3), which compressor impeller is disposed in a compressor housing (2) that is provided with at least one air inlet (21) and one air outlet (22), wherein the air inlet (21) and the air outlet (22) communicate via a flow conduit (8, 9) extending in the compressor housing (2), and compression of the charge air is attainable in a compression portion (8) of the flow conduit by rotation of the compressor impeller (3), the compressor impeller (3) being mounted for displacement in the compressor housing (2) out of a working position into a position of repose and back again, the compressor impeller (3) upon a displacement into the position of repose being moved at least partway away from the compression portion (8) of the flow conduit.

2. The electrically operated charge-air compressor according to claim 1 wherein in operation, a displacement of the compressor impeller (3) from a working position to the position of repose can be accomplished at least in part by the static and/or dynamic pressure forces of the charge air after shutoff of the electromagnet (4, 5).

3. The electrically operated charge-air compressor according to claim 1 wherein the compressor housing (2) together with the compressor impeller (3) is embodied as a radial compressor.

4. The electrically operated charge-air compressor according to claim 1, wherein the compressor impeller (3) is displaceable parallel to the pivot axis (10) of the compressor impeller.

5. The electrically operated charge-air compressor according to claim 4, wherein the rotor (5) of the electric motor is coupled to the compressor impeller (3) in such a way that a displacement of the rotor (5) parallel to the pivot axis (10) of the compressor impeller causes a displacement of the compressor impeller (3) in the compressor housing (2).

6. The electrically operated charge-air compressor according to claim 5, wherein the rotor (5) is coupled to the compressor impeller (3) via a shaft (6).

7. The electrically operated charge-air compressor according to claim 6 wherein the stator (4) has a first magnet part (42) and the rotor (5) has a second magnet part (52), and that when voltage is imposed on the electric motor in the position of repose of the compressor impeller (3), the second magnet part (52) is displaceable axially into a position that is symmetrical to the first magnet part (42) by means of reluctance forces that are operative between the first magnet part (42) and the second magnet part (52).

8. The electrically operated charge-air compressor according to claim 7, wherein, in the symmetrical position of the second magnet part (52), the compressor impeller (3) coupled to the rotor (5) is located in a first working position, in which compressor structures (31) disposed on the compressor impeller (3) engage the compression portion (8).

9. The electrically operated charge-air compressor according to claim 5 wherein the stator (4) has a first magnet part (42) and the rotor (5) has a second magnet part (52), and that when voltage is imposed on the electric motor in the position of repose of the compressor impeller (3), the second magnet part (52) is displaceable axially into a position that is symmetrical to the first magnet part (42) by means of reluctance forces that are operative between the first magnet part (42) and the second magnet part (52).

10. The electrically operated charge-air compressor according to claim 9, wherein the electric motor is a reluctance motor.

11. The electrically operated charge-air compressor according to claim 9 wherein, the first magnet part (42) is a magnet coil, and the second magnet part (52) is a magnet armature.

12. The electrically operated charge-air compressor according to claim 11, wherein the electric motor is a reluctance motor.

13. The electrically operated charge-air compressor according to claim 9, wherein facing sides (43, 53) of the first magnet part (42) and of the second magnet part (52) are embodied conically. (FIG. 4).

14. The electrically operated charge-air compressor according to claim 13 wherein the first magnet part (42) is a magnet coil, and the second magnet part (52) is a magnet armature.

15. The electrically operated charge-air compressor according to claim 13, wherein the electric motor is a reluctance motor.

16. The electrically operated charge-air compressor according to claim 9, wherein, in the symmetrical position of the second magnet part (52), the compressor impeller (3) coupled to the rotor (5) is located in a first working position, in which compressor structures (31) disposed on the compressor impeller (3) engage the compression portion (8).

17. The electrically operated charge-air compressor according to claim 16 wherein the first magnet part (42) is a magnet coil, and the second magnet part (52) is a magnet armature.

18. The electrically operated charge-air compressor according to claim 16 wherein the electric motor is a reluctance motor.

19. The electrically operated charge-air compressor according to claim 16, wherein facing sides (43, 53) of the first magnet part (42) and of the second magnet part (52) are embodied conically. (FIG. 4).

20. The electrically operated charge-air compressor according to claim 19, wherein the electric motor is a reluctance motor.

21. The electrically operated charge-air compressor according to claim 16, characterized in that in the first working position of the compressor impeller (3), a pressure chamber (26), which communicates with a high-pressure portion of the flow conduit (8, 9), is formed between a side (33) of the compressor impeller (3) remote from the air inlet (21) and a wall (24) of the compressor housing (2).

22. The electrically operated charge-air compressor according to claim 21, characterized in that the compressor impeller (3) is movable, by means of an axial displacement resulting from an imposition of pressure on the pressure chamber, out of the first working position into a second working position, in which latter position the compressor structures (31) of the compressor impeller (3) are spaced apart by only a very narrow gap from a wall (23) of the compressor housing (2) that defines the compression portion (8) of the flow conduit.

23. The electrically operated charge-air compressor according to claim 22, wherein by means of a stop part (16) fixed to the rotor (5), in the second working position a minimum spacing of the compressor structures (31) of the compressor impeller (3) from the wall (23) of the compressor housing (2) is assured.

* * * * *